(12) United States Patent
Parry-Jones (10) Patent No.: US 7,957,049 B1
(45) Date of Patent: Jun. 7, 2011

(54) HIGHLY REFLECTIVE MEMS DEVICE

(75) Inventor: Lesley Anne Parry-Jones, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/704,560

(22) Filed: Feb. 12, 2010

(51) Int. Cl.
*G02B 26/00* (2006.01)

(52) U.S. Cl. ........................................ 359/290; 359/291

(58) Field of Classification Search .................. 359/290, 359/291
See application file for complete search history.

(56) References Cited

U.S. PATENT DOCUMENTS

| | | | |
|---|---|---|---|
| 5,835,255 A | 11/1998 | Miles | |
| 5,986,796 A | 11/1999 | Miles | |
| 6,055,090 A | 4/2000 | Miles | |
| 7,372,613 B2 | 5/2008 | Chui et al. | |
| 2004/0222418 A1* | 11/2004 | Mochizuki | 257/59 |

OTHER PUBLICATIONS

Co-pending U.S. Appl. No. 12/568,622, filed Sep. 28, 2009.
Co-pending U.S. Appl. No. 12/568,622, filed Sep. 28, 2009 (Previously listed on IDS submitted Feb. 12, 2010).

* cited by examiner

*Primary Examiner* — Ricky L Mack
*Assistant Examiner* — James C Jones
(74) *Attorney, Agent, or Firm* — Renner, Otto, Boisselle & Sklar, LLP

(57) ABSTRACT

An interference-based MEMS device having a lower substrate including a substrate electrode; a lower membrane spaced apart from the lower substrate by a lower gap, the lower membrane including a lower membrane electrode; an upper membrane located on a side of the lower membrane opposite the lower substrate and spaced apart from the lower membrane by an upper gap, the upper membrane including an upper membrane electrode; and control circuitry configured to provide control voltages to the electrodes of the lower substrate, the lower membrane and the upper membrane to change the dimensions of the lower gap and the upper gap to control the reflective properties of the device with respect to light incident upon the lower substrate.

17 Claims, 7 Drawing Sheets

HIGHLY REFLECTIVE MEMS DEVICE

TECHNICAL FIELD OF INVENTION

The present invention relates to a micro-electrical-mechanical systems (MEMS) reflective display in which the strength and colour of the reflected light is governed by the principles of the optical interference of visible light. Optical contrast and colour changes from the pixels of the display are obtained by the movement of thin membranes which are separated from each other and from one substrate of the display by air gaps of the order or less than the wavelength of visible light.

BACKGROUND OF INVENTION

Many electronic display devices that we are familiar with are emissive, for example laptop screens, desktop monitors and televisions. Such devices, whilst highly visible indoors, are hard to see in bright (particularly outdoor) conditions. Additionally, such devices are often power-hungry due to the need to generate light either via a backlight in the case of liquid crystal displays (LCDs) or within the display itself in the case of CRTs or OLEDS.

An alternative to such emissive displays is to use a reflective display, in which the image is generated by modulating the intensity of the reflected ambient light. Such displays have the advantage of working with (rather than competing against) the strength of the ambient light, and hence are a good solution for displays which are used primarily in bright conditions. They also tend to have much lower power consumption, because there is no light generation involved. If necessary, the display can also be fitted with a front-light (which provides illumination from the front surface of the display) so that it can be read in darker environments also.

LCDs are notoriously inefficient when used in either transmissive or reflective mode, due to the losses involved in the polarisers, colour filters and black mask in the display structure. When used in transmission, a high brightness display can nonetheless be achieved by using a bright backlight, but this comes at the cost of high power consumption. When used in reflective mode, however, these inefficiencies result in a low reflectivity and as a result poor image brightness, much less than the brightness that would be achieved from the ultimate reflective display: paper.

In recent years, alternatives to reflective LCDs have emerged onto the market-place, the most commonplace being E-Ink technology. This has been used primarily to make monochrome e-book readers, such as the Amazon Kindle®. The white state reflectivity of such e-books is around 35-40% which, whilst comparable with newspaper, still falls short of the reflectivity from a quality white piece of paper. A more recent emerging technology is the Mirasol® display from Qualcomm MEMS Technologies, which uses an interference-based MEMS method to generate a switch between pixels which appear either black or green. Qualcomm claim 45% reflectivity in these displays which they term "bichrome" because the bright state is green rather than white.

These emerging technologies, whilst perhaps beginning to out-perform monochrome active-matrix LCDs, are still not reflective enough to be able to generate a high reflectivity colour image. To create a colour image, E-Ink would simply need to add colour filters to their display, which would cut the white state reflectivity down by about ⅓ to around 11-13%. Qualcomm claim to have a colour version of their Mirasol® display which works not by having colour filters as such, but nonetheless by having colour sub-pixels which (in their bright state) reflect either red, green or blue, but not tunable colour. Their projected white state reflectivity for such displays is 25%, which would be the highest reflectivity colour display on the market today.

However, whilst this performance is impressive, it still falls rather short of the white state reflectivity we are accustomed to in printed colour images on paper (~60-70%), and is a direct result of the spatial sub-pixel method used to generate colour. An alternative is to use the interference-based MEMS pixels to generate tunable colour pixels, which would immediately triple the colour reflectivity simply due to the amount of area which is reflecting the correct colour. The issue is that colour tunable pixels, whilst in principle possible, often lack a good broadband white state and hence it is impossible to create a white state whose reflectivity is in proportion to that of the coloured states.

U.S. Pat. No. 5,835,255 (Miles; November 1998) describes an interference-based MEMS (IMod) display in which one type of pixel can switch between reflecting either none or some of the visible spectrum (therefore appearing either black or coloured in reflection). There is also another type of pixel described which can reflect either all or some of the visible spectrum (appearing either white or coloured). There is no type of pixel described which can reflect either none, some or all of the visible spectrum (appearing black, coloured or white). Some other types of pixels are described which can continuously tune their colour by being under analogue (rather than bistable) control.

U.S. Pat. No. 5,986,796 (Miles; November 1999), in addition to the material of the previous patent, describes another type of pixel which can switch between reflecting either none or all of the visible spectrum (appearing either black or white). However, it is not taught how to make this type of pixel. Neither can that type of pixel also reflect only some of the visible spectrum (appearing coloured).

U.S. Pat. No. 6,055,090 (Miles; April 2000) describes a reflective IMod display using the type of pixels previously described in U.S. Pat. No. 5,835,255 that can switch between reflecting either none or some of the visible spectrum (appearing either black or coloured). A method of making a colour reflective display is described in which the colour is generated by mixing light reflected from red, green and blue sub-pixels, rather than tuning the colour reflected from a single pixel. A red sub-pixel can reflect either no light or red light (appearing black or red). A green sub-pixel can reflect either no light or green light (appearing black or green). Likewise a blue sub-pixel can reflect either no light or blue light (appearing black or blue). A white reflection is generated by switching each of the colour sub-pixels to their colour reflecting state, and a white colour is perceived from the mixture of red, green and blue light. The brightness of the white state is limited by the fact the area of the display is divided into colour sub-pixels, because each part of the area of the display will always absorb at least part of the visible region of the spectrum.

U.S. Pat. No. 7,372,613B2 (Chui; May 2008) describes a reflective IMod display which again generates colour by using red, green and blue sub-pixels, as described above. It is explained how there is a trade-off between colour saturation and white state brightness. A method of switching each colour sub-pixel between states which appear black, coloured and white is described. The purpose of the extra white state is to boost the brightness of the display in the white state. The possibility of tuning the peak wavelength of the reflected light in the coloured state is not disclosed: colour is still generated spatially using red, green and blue sub-pixels.

U.S. application Ser. No. 12/568,622 (Sharp Laboratories of America, filed 28 Sep. 2009) describes a reflective IMod display which generates tunable colour through analogue voltage control via a buried ITO electrode, but there is no method described which would generate a white state whose reflectivity is in proportion to that of the coloured states generated.

SUMMARY OF THE INVENTION

The present invention relates to a reflective IMod display which has a type of pixel which can switch between reflecting either none, some or all of the visible spectrum (appearing either black, coloured or white). There are at least two important differences between the present invention and that described in U.S. Pat. No. 7,372,613B2. The first difference is that the peak wavelength of light reflected in the coloured state is tunable. It is therefore possible to make a coloured display without using coloured sub-pixels, resulting in highly reflective coloured states. The second difference is that the white state is generated in a completely different way to the method described in U.S. Pat. No. 7,372,613B2. The method described in U.S. Pat. No. 7,372,613B2 involves moving a membrane between three possible positions between two substrates, corresponding to the three different reflectivities. In the present invention, however, two membranes are included which can be moved independently and make contact with only one substrate. It is whether the two membranes move together on top of the substrate, or whether one membrane remains on the substrate whilst the other one moves determines that whether a broadband or narrowband reflection is obtained.

According to an aspect of the invention, an interference-based MEMS device is provided having a lower substrate including a substrate electrode; a lower membrane spaced apart from the lower substrate by a lower gap, the lower membrane including a lower membrane electrode; an upper membrane located on a side of the lower membrane opposite the lower substrate and spaced apart from the lower membrane by an upper gap, the upper membrane including an upper membrane electrode; and control circuitry configured to provide control voltages to the electrodes of the lower substrate, the lower membrane and the upper membrane to change the dimensions of the lower gap and the upper gap to control the reflective properties of the device with respect to light incident upon the lower substrate.

According to another aspect, the control circuitry is configured to control the dimensions of the lower gap and the upper gap independently.

In accordance with another aspect, the lower substrate and the lower membrane are at least partially transmissive, but due to the change in refractive index at the boundary between any two media, are also at least partly reflective. The lower membrane can also contain a thin layer of a significantly absorbing material such as some types of metal. The upper membrane will generally be a substantially non-transmissive, or opaque, reflective layer.

According to another aspect, the control circuitry is configured to provide a first mode of operation in which the dimension of the lower gap is reduced to zero such that the lower membrane is held in contact with the lower substrate, and a colour of light reflected by the device is determined by controlling the dimension of the upper gap.

According to yet another aspect, during the first mode of operation when the dimension of the upper gap is at an equilibrium state the colour of the reflected light is red, and when the dimension of the upper gap is reduced to zero the colour of the reflected light appears substantially black.

In accordance with still another aspect, at corresponding intermediate dimensions of the upper gap the colour of the reflected light includes blue and green.

In accordance with another aspect, the control circuitry is configured to provide a second mode of operation in which the dimension of the upper gap is reduced to zero such that the upper membrane is held in contact with the lower membrane, and the intensity of light reflected by the device is determined by controlling the dimension of the lower gap.

According to another aspect, during the second mode of operation when the dimension of the lower gap is at an equilibrium state the reflected light is white, and when the dimension of the lower gap is reduced to zero the reflected light appears substantially black.

In accordance with another aspect, at corresponding intermediate dimensions of the lower gap the reflected light includes respective grey levels.

In accordance with still another aspect, the lower membrane electrode and the upper membrane electrode are patterned to define an array of pixels independently controlled by the control circuitry.

According to another aspect, the lower membrane and the upper membrane are attached to the lower substrate at intervals.

According to another aspect, the lower gap and upper gap are air-filled.

According to another aspect, the lower membrane and the upper membrane include via holes to facilitate air entering and exiting the lower gap and upper gap.

In accordance with another aspect, a portable device is provided including a display having an interference-based MEMS device.

According to another aspect, a method of controlling an interference-based MEMS device is provided, wherein colours of reflected light requiring multiple peaks in the visible spectrum are provided in the first mode of operation by rapidly varying the dimension of the upper gap so as to be perceived by a viewer as a single colour.

In accordance with yet another aspect, a method of controlling an interference-based MEMS device is provided, wherein levels of grey scale are provided by rapidly varying the dimension of the lower gap so as to be perceived by a viewer as a single grey scale level.

According to another aspect, a method of controlling an interference-based MEMS device is provided. The device includes a lower substrate including a substrate electrode; a lower membrane spaced apart from the lower substrate by a lower gap, the lower membrane including a lower membrane electrode; an upper membrane located on a side of the lower membrane opposite the lower substrate and spaced apart from the lower membrane by an upper gap, the upper membrane including an upper membrane electrode; and control circuitry configured to provide control voltages to the electrodes of the lower substrate, the lower membrane and the upper membrane to change the dimensions of the lower gap and the upper gap to control the reflective properties of the device with respect to light incident upon the lower substrate. The method includes during a first mode of operation reducing the dimension of the lower gap to zero such that the lower membrane is held in contact with the lower substrate, and controlling the dimension of the upper gap to control a colour of light reflected by the device, wherein colours of reflected light requiring multiple peaks in the visible spectrum are provided by rapidly varying the dimension of the upper gap so as to be perceived by a viewer as a single colour; during a second mode of operation reducing the dimension of the upper gap to zero such that the upper membrane is held in contact with the lower membrane, and controlling the intensity of light reflected by the device by controlling the dimension of the lower gap, wherein levels of grey scale are provided by rapidly varying the dimension of the lower gap so as to be perceived by a viewer as a single grey scale level; and time sequentially combining the first and second modes of operation so as to be perceived by a viewer to produce an unsaturated colour of light reflected by the device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, like references indicate like parts or features.

KEY FOR FIGURES

| 1 | lower substrate |
|---|---|
| 2 | thin-film stack |
| 2a | conductive layer within the thin-film stack |
| 2b-2e | dielectric layers |
| 3a | lower membrane |
| 3b | upper membrane |
| 3a1 | conductive layer within the lower membrane |
| 3a2 | dielectric layer within the lower membrane |
| 3b1 | conductive layer within the upper membrane |
| 4a | lower air-gap |
| 4b | upper air-gap |
| 5a | first pixel |
| 5b | second pixel |
| 5c | third pixel |
| 6 | control circuitry |
| 6a | first collection of at least one transistor |
| 6b | second collection of at least one transistor |
| 7 | upper substrate |
| 8 | vertical connector |
| 9 | via hole |
| 10 | black mask |
| 11 | viewer |

DETAILED DESCRIPTION OF THE INVENTION

Figure 1:
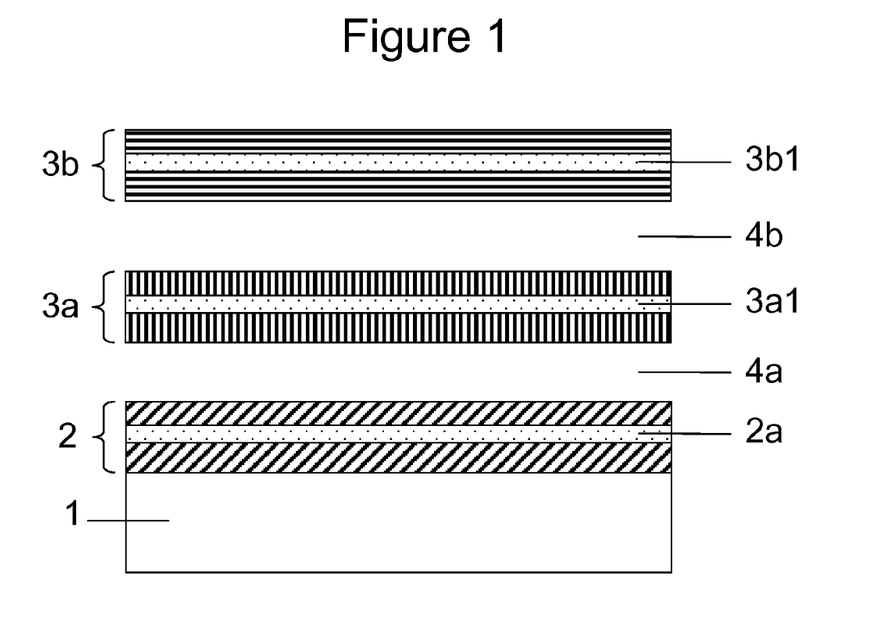
FIG. 1: Illustrates the layer structure within the active areas of the pixels of a display in accordance with an exemplary embodiment of the present invention.
Figure 2:
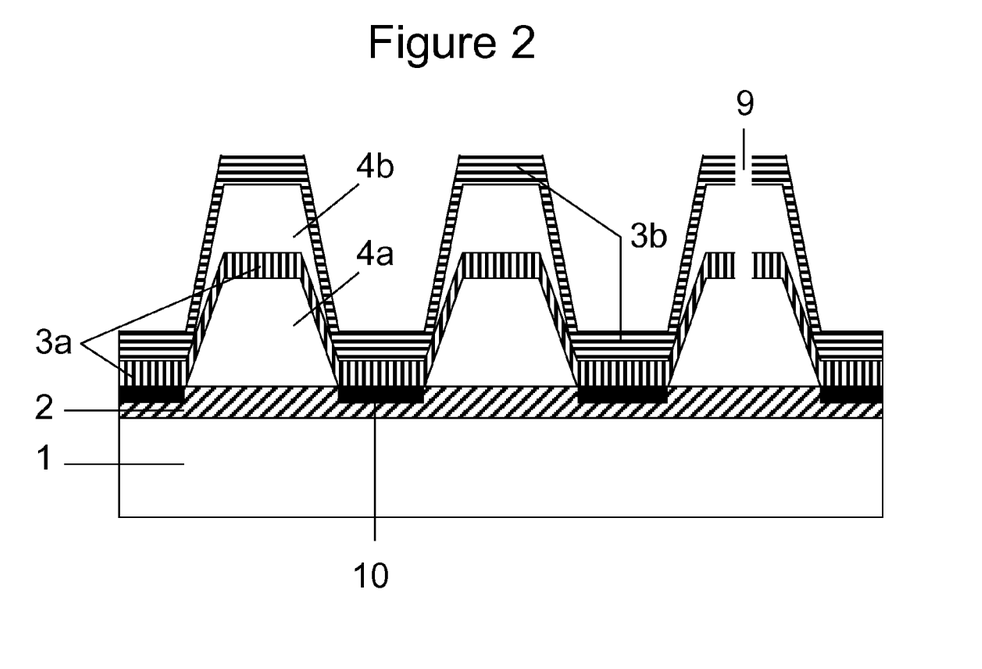
FIG. 2: illustrates how two membranes are attached to a substrate at regular intervals.
Figure 3:
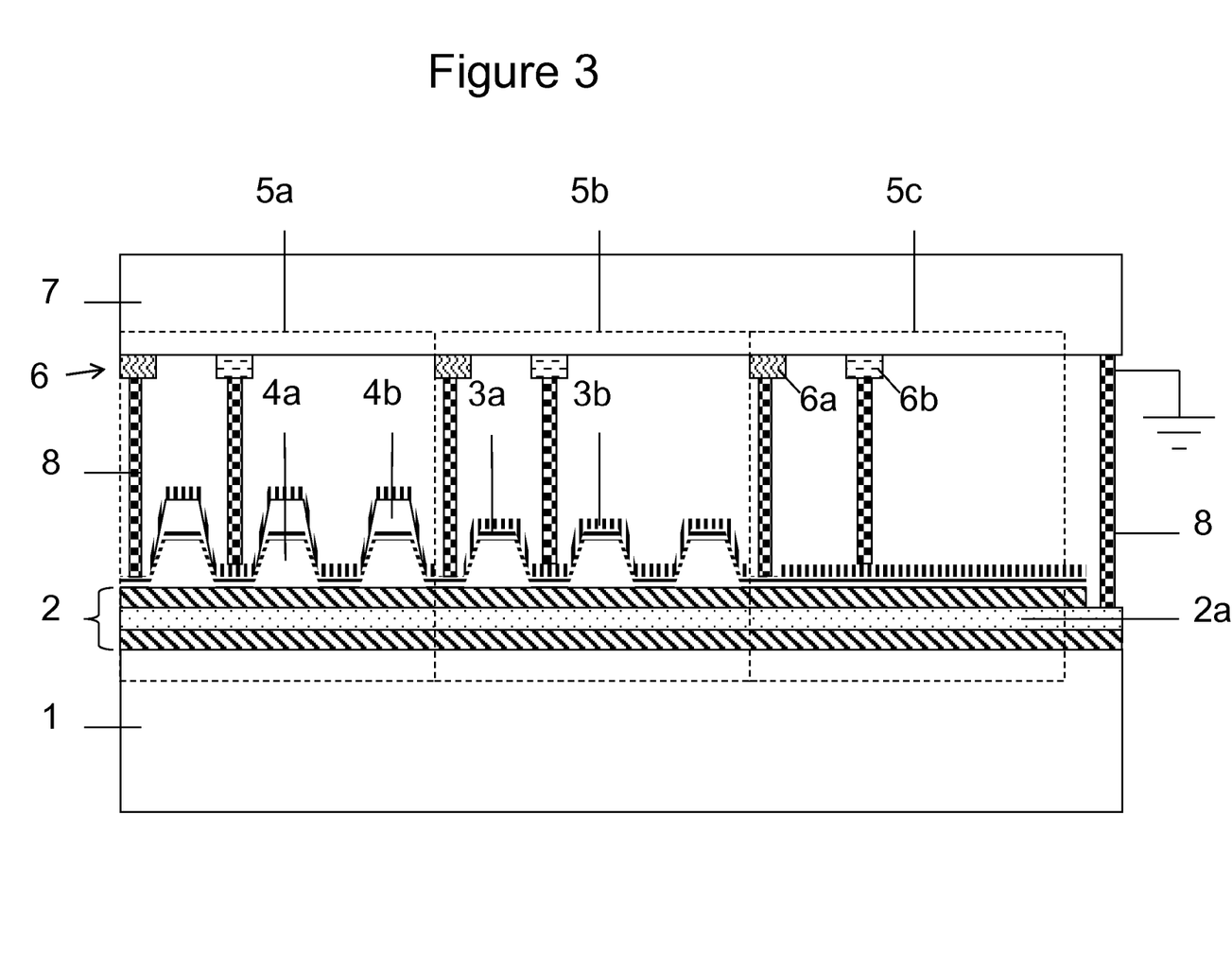
FIG. 3: Illustrates how the two membranes in each pixel are connected electrically to control circuitry situated on an upper substrate which is not visible to the viewer.

Referring to FIG. 1, in an exemplary embodiment of this invention the display includes a lower substrate 1 (for example glass) on which there is a thin-film stack 2 deposited. The thin-film stack 2 is generally optically transparent and includes at least one layer 2a which is made from a conductive material and therefore can act as an electrode. Situated above and parallel to this substrate 1 (on the same side as the thin-film stack 2), there are two flexible membranes 3a and 3b, which for the active area of the display (and when in their equilibrium positions) are separated from the substrate 1 and each other by air-gaps 4a and 4b as shown in FIG. 1. The size of the air-gaps 4a and 4b with the two membranes 3a and 3b in their equilibrium positions is determined during fabrication by the height of so-called sacrificial layers which are deposited in order to define a certain spacing between the membranes, and then subsequently etched away to leave air gaps of the same thickness as the original sacrificial layers. Both membranes 3a and 3b are conductive or contain conductive layers 3a1 and 3b1, so they too can act as respective electrodes. The conductive layers 3a1 and 3b1 may be patterned, however, in order to maintain electrical isolation between different pixels of the display. At regular intervals, the membranes 3a and 3b are in contact with the substrate 1 as shown in FIG. 2. By attaching the membranes 3a and 3b to the substrate 1 at regular intervals, this provides mechanical stability, ease of fabrication, and provides points at which to make electrical contact with control circuitry 6 for the display as shown in FIG. 3. The membranes 3a and 3b will also have small via holes 9 (FIG. 2) preferably distributed throughout which are utilized in the fabrication process (to allow etching away of the sacrificial layer that the membranes 3a and 3b are initially fabricated upon). These via holes 9 also have the advantage that when the membranes 3a and 3b are actuated (i.e. moved up and down, as described below), they allow a route for air to enter and exit the gaps 4a and 4b between the membranes and the thin-film stack 2.

Figure 4:
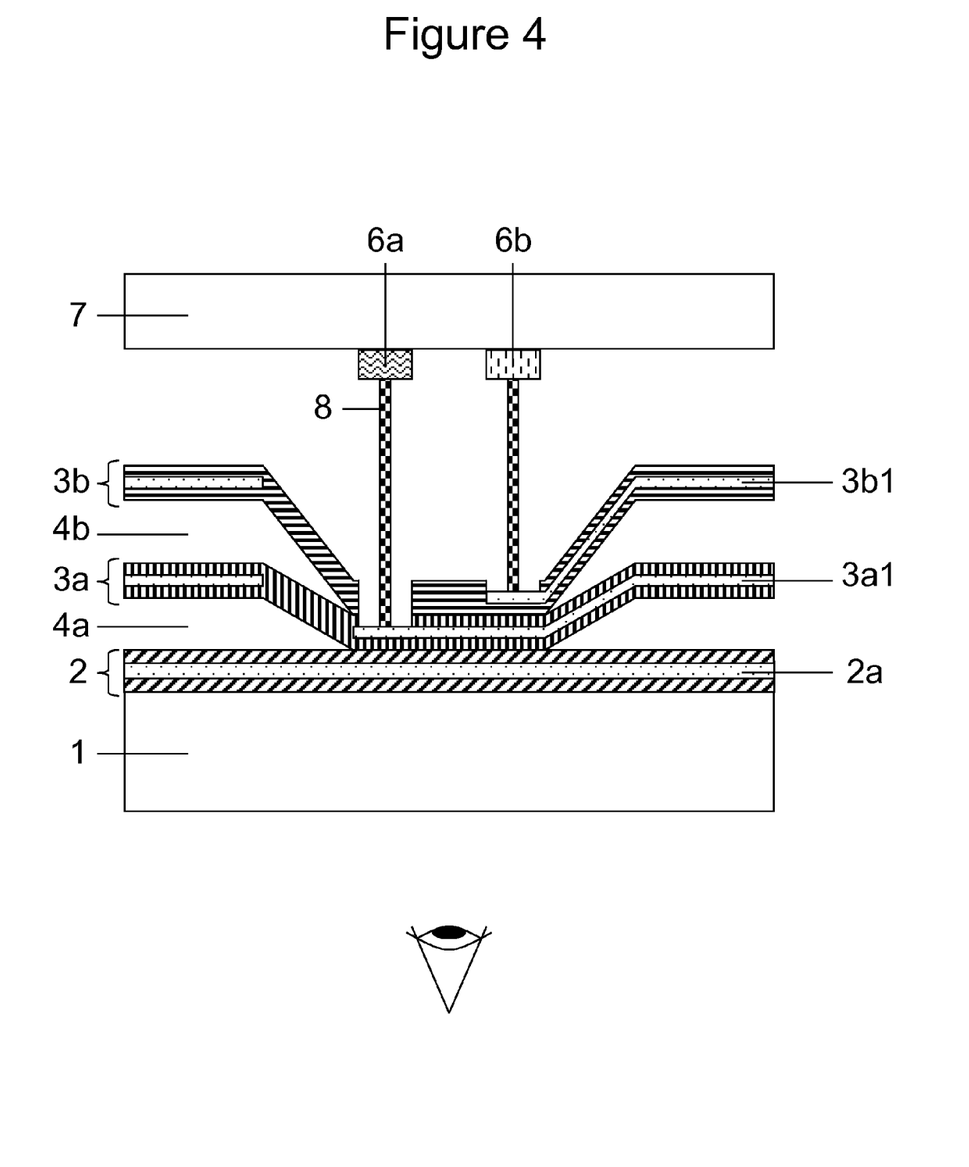
FIG. 4: illustrates in further detail how the electrical connection of the membranes to the control circuitry can be made by patterning the sub-layers of the membranes.

Each pixel of the display can include either one or many of these membranes, although for optimum control each pixel includes at least two membranes. In the exemplary embodiment, each pixel includes the two membranes 3a and 3b which are able to move independently of each other within the same pixel, and independently of the equivalent membrane layer in other pixels of the display, as illustrated in FIG. 3. For example, FIG. 3 shows three independent pixels 5a, 5b and 5c. Pixel 5a illustrates the membranes 3a and 3b in their equilibrium state including air gaps 4a and 4b. Pixel 5b illustrates the membrane 3b collapsed upon the membrane 3a eliminating the air gap 4b while retaining the air gap 4a. Pixel 5c shows both membranes 3a and 3b collapsed upon the thin-film stack 2. This independent control is achieved by connecting the membranes 3a and 3b electrically to control circuitry 6 which is situated on an upper substrate 7 which is positioned above the upper membrane 3b. There are at least two transistors per pixel. For example, transistors 6a and 6b in FIG. 3 are two separate transistors (or collections of transistors) which are separately connected to the conductive layers 3a1 and 3b1 (FIG. 1) within the lower and upper membranes 3a and 3b, respectively. Therefore, there are two control voltages available per pixel: one electrically connected to each of the membranes 3a and 3b, via respective vertical connectors 8, as illustrated in greater detail in FIG. 4. Here it is shown that if the upper and lower membranes 3b and 3a contain dielectric layers sandwiching the respective conductive layers 3b1 and 3a1, then the dielectric layers are patterned as appropriate in order to make electrical contact between the conductive layers 3a1 and 3b1 and the vertical connectors 8. FIG. 4 also shows how electrical isolation between neighbouring pixels is achieved by patterning the conductive layers 3a1 and 3b1. FIG. 3 shows that there is also a further connection made between the control circuitry 6 on substrate 1 and the electrode represented by the conductive layer 2a on the lower substrate 1, again via a vertical connector 8. This is simply to provide a reference level voltage to conductive layer 2a so that potential differences can be applied between the conductive layer 2a and the conductive layers 3a1 and 3b1 within the membranes 3a and 3b, respectively. This connection will generally need to be done only once for the entire display, and could well also be connected to ground (as illustrated in FIG. 3), but this is not necessarily the case.

The control circuitry 6 provides control voltages to the conductive layers 3a1 and 3b1 relative to the conductive layer 2a. The control voltages provide electrostatic charge to each of the lower and upper membranes 3a and 3b so that they may be moved independently relative to the lower substrate 1. With appropriate control voltages, which may be determined by design and/or empirically, the control circuitry 6 can selectively control the gaps between the lower and upper membranes and the lower substrate 1 to obtain the desired reflection in each pixel as described in more detail below.

More particularly, by controlling the gaps between the membranes 3a, 3b and the lower substrate 1, the phase differences between the light waves separately reflected from membranes 3a and 3b, and the thin-film stack 2 can be altered, thereby controlling the both intensity and colour of the overall reflected light.

The lower substrate 1 and the lower membrane 3a are at least partially transmissive, but due to the change in refractive index at the boundary between any two media, are also at least partly reflective. The lower membrane 3a can also contain a thin layer of a significantly absorbing material such as some types of metal. The upper membrane 3b will generally be a substantially non-transmissive, or opaque, reflective layer.

Note that a viewer observing the pixels from underneath the lower substrate 1 will generally not see the vertical connectors 8 or the control circuitry 6 for driving the pixels (e.g., 5a, 5b, 5c) with applied voltage. The connectors 8 will generally be masked off by a black mask material 10 formed on the lower substrate 1 or thin-film stack 2 so the connectors 8 are not visible to the user, as shown in FIG. 2. This does not detract from the quality of the display, as the connectors 8 are positioned at the points of the respective membranes 3a and 3b which are fixed to the thin-film stack 2 and therefore would not give optical contrast anyway. The control circuitry 6 (transistors and metal electrodes, etc.) are positioned above the upper membrane 3b. Generally, the upper membrane 3b will be optically opaque, and it will therefore not be possible for the viewer to see the control circuitry 6.

Figure 5:
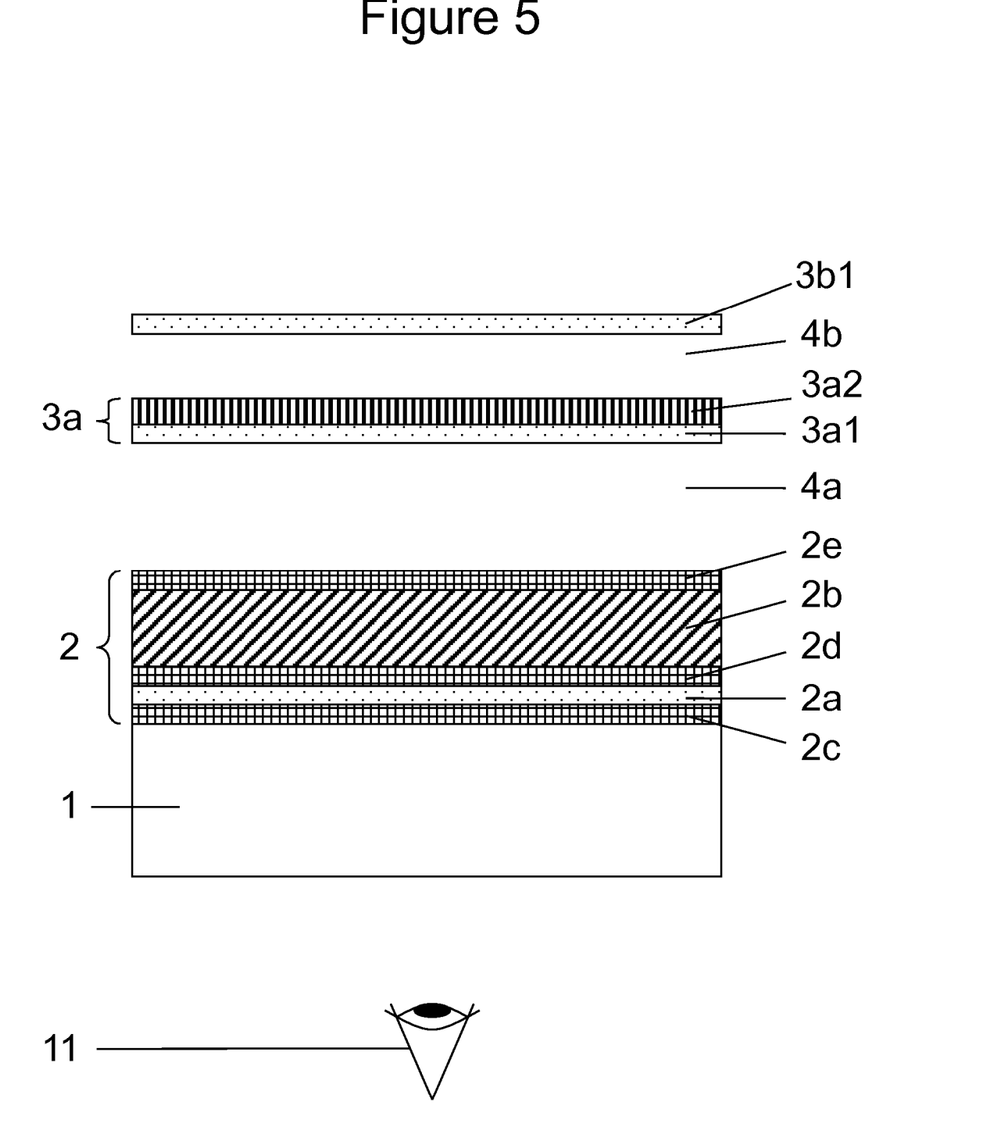
FIG. 5: illustrates an example of a suitable layer structure that gives good optical characteristics.

FIG. 5 shows a specific example of a design which can be used to achieve optical characteristics which would be desirable for a reflective display, but the invention is by no means limited to this design. The lower substrate 1 is a transparent material such as plastic or glass. The thin-film stack 2 on top of the lower substrate 1 may include a transparent conductive layer 2a such as indium tin oxide (ITO), which is "buried" under a thick (~700 nm) layer 2b of dielectric material such as silicon dioxide ($SiO_2$). For the purposes of the following explanation we shall assume that the three materials for the lower substrate 1, conductive layer 2a and dielectric layer 2b are glass, ITO and silicon dioxide, respectively. However, it will be appreciated that the invention is not restricted to these materials. Normally, the refractive index mismatch between glass/SiO2 (n~1.5) and ITO (n~1.9) would lead to multiple reflections which could affect the performance of the display. However, in this invention, the ITO electrode formed by conductive layer 2a is sandwiched between two layers of a dielectric material 2c and 2d of such a refractive index and thickness as to minimise these multiple reflections, and effectively make the ITO conductive layer 2a invisible. An example of a suitable three-layer sandwich is shown in FIG. 5, where: dielectric layer 2c is 72 nm thick SiON (n~1.7), dielectric layer 2a is 85 nm thick ITO (n~1.9) and dielectric layer 2d is 72 nm thick SiON (n~1.7). On top of these three layers 2a, 2c and 2d are the thick (~700 nm) dielectric layer 2b of silicon dioxide, and then a thinner (~55 nm) dielectric layer 2e of a material such as silicon nitride or zirconium dioxide (n~2.05). The lower membrane 3a includes two layers 3a1 and 3a2. The lower of the two layers 3a1 is a very thin (10-15 nm) layer (i.e., so as to be substantially optically transparent) of an absorbent conductive metal such as tungsten (W), molybdenum (Mo) or chromium (Cr). The upper of the two layers 3a2 in the lower membrane 3a is a dielectric layer, such as 50 nm of silicon dioxide ($SiO_2$) (also substantially optically transparent). The upper membrane 3b is substantially optically reflective and may be simply the aforementioned conductive layer 3b1 as shown in FIG. 5. For example, the upper membrane 3b may be a layer 3b1 of a reflective metal such as aluminium (Al), silver (Ag) or nickel (Ni). The thickness of the upper membrane 3b is not critical (in terms of optical considerations), so long as it is thicker than about 50 nm (i.e. is substantially opaque). It can be supported by further dielectric layers to give mechanical strength (not illustrated in FIG. 5). In this design, the equilibrium lower and upper air-gaps 4a and 4b are around 130 nm and 245 nm respectively.

Figure 6:
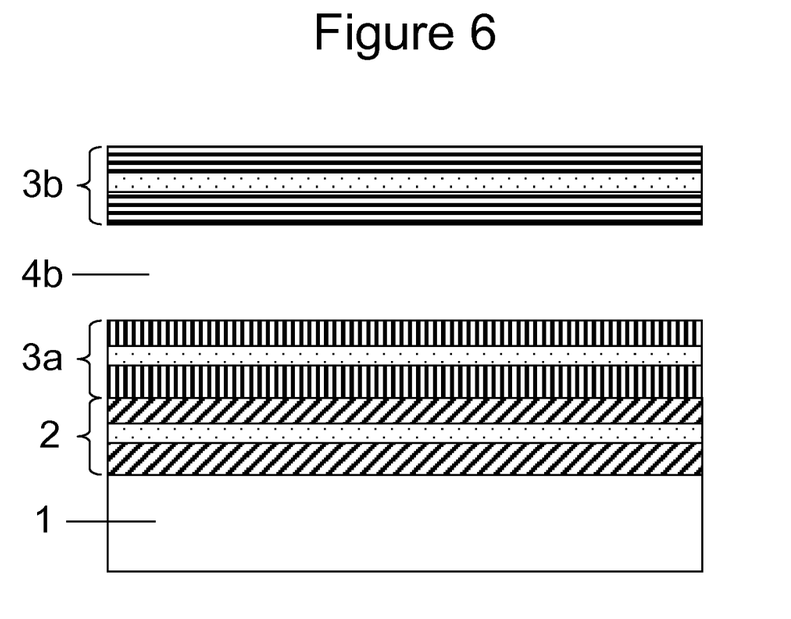
FIG. 6: illustrates a first mode of operation in which the lower membrane is held in contact with the thin-film stack on the lower substrate.

The device can operate in two different modes of operation according to whether narrowband (coloured) or broadband (colourless) reflections are required. In order to enter the first mode of operation (which is used to generate narrowband coloured reflections), the lower membrane 3a is held in contact with the thin-film stack 2, so that the lower air-gap 4a is absent as shown in FIG. 6. This mode of operation is used to display either a black or coloured reflection to a viewer who observes from underneath the lower substrate 1. The peak wavelength of the reflected light is determined by the size of the air-gap 4b between the lower membrane 3a and upper membrane 3b. When the air-gap 4b is reduced to zero, the peak wavelength is in the ultra-violet region of the visible spectrum, and very little visible light is reflected to the viewer, and so the pixel appears black.

Figure 7:
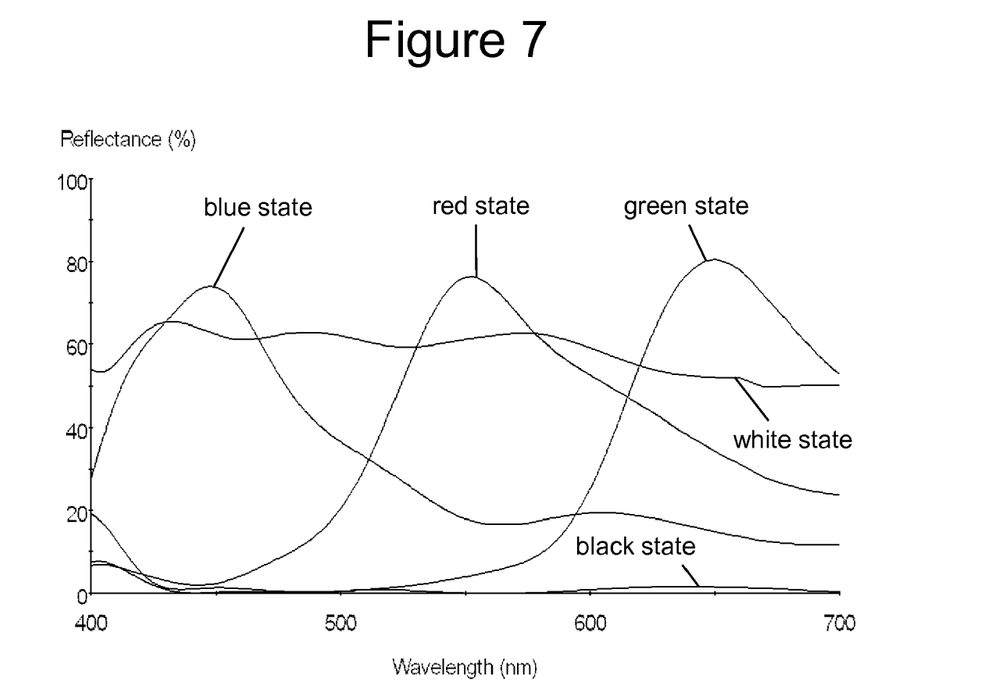
FIG. 7: shows a graph of simulated results for the structure shown in FIG. 5 when driven to reflect black, blue, green, red and white light.

A prediction of the optical performance that would be obtained using the design of FIG. 5 in this first mode of operation is shown in FIG. 7. The reflectivity of the structure (as would be perceived by a viewer 11 observing the device at normal incidence from underneath the lower substrate) is plotted as a function of wavelength in the visible region of the spectrum (400 nm-700 nm), for four different sizes of the upper air-gap 4b between the lower 3a and upper 3b membranes, specifically 0 nm, 135 nm, 195 nm and 245 nm. The different sizes correspond to black, blue, green and red reflections from the pixel, respectively. Although we use the traditional examples of red, green and blue colours here, it is of course possible to generate colours of intermediate peak wavelength such as purple, cyan, orange and yellow. These will correspond to different upper air-gaps 4b. It can be seen that the peak reflectivity is predicted to be in excess of 70% which is comparable with that of reflections from good quality coloured paper. Because it is not necessary for the upper air-gap 4b to be any larger than the value needed to reflect red light (in this case 245 nm), it is useful if this is the equilibrium value of the air-gap 4b. This is determined in the fabrication of the device by the thickness of the sacrificial layer used to space apart the upper membrane 3b from the lower membrane 3a.

Figure 8:
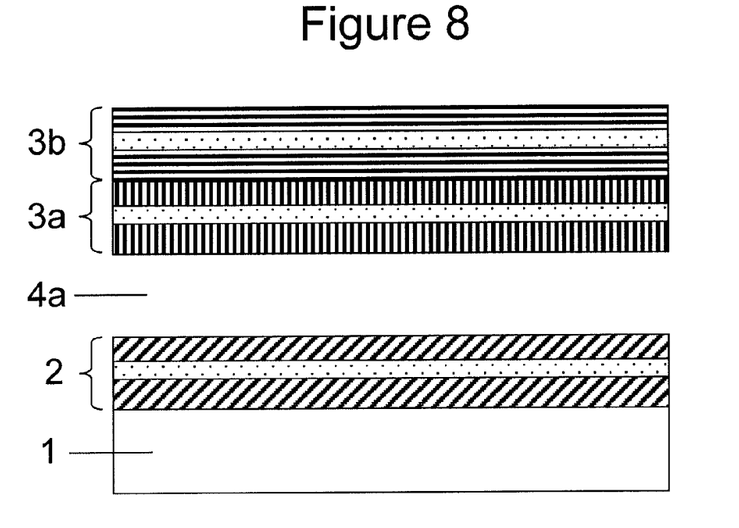
FIG. 8: illustrates a second mode of operation in which the upper and lower membranes are held in contact with each other.

In the second mode of operation (which is used to generate a broadband reflection and thereby control intensity), the lower membrane 3a is not held in contact with the thin-film stack 2, and the lower air-gap 4a resumes its equilibrium value (130 nm in the case of the design in FIG. 5). Instead, the lower 3a and upper 3b membranes are held in contact with each other so that the upper air gap 4b is absent, as shown in FIG. 8. In this mode of operation, there is a broadband white reflection from the pixel, as shown in FIG. 7, again for the case of the design illustrated in FIG. 5. Here, the broadband reflectivity is around 60%, similar to that of paper. In this case, the white state is generated when the lower air-gap 4a is 130 nm, and therefore the device should be designed so that the equilibrium value of the lower air-gap 4a has this value. This is determined in the fabrication of the device by the thickness of the sacrificial layer used to space apart the lower membrane 3a from the thin-film stack 2.

It has been described how the two modes of operation can be used to generate the following types of reflection: black, white, and any saturated colour which has a single well-defined wavelength peak anywhere in the visible region of the spectrum (i.e. from violet to red). Table 1 summarises the values of the lower 4a and upper 4b air-gaps that are required in order to generate these reflections, for the specific design illustrated in FIG. 5.

TABLE 1

| Colour of reflection | Mode of operation | Lower air-gap 4a | Upper air-gap 4b |
|---|---|---|---|
| red | first | 0 | 245 nm |
| green | first | 0 | 195 nm |
| blue | first | 0 | 135 nm |
| black | first/second | 0 | 0 |
| white | second | 130 nm | 0 |

In order to generate other types of reflection, for example greys, unsaturated colours and mixed colours such as magenta, the display can be switched very quickly (sub video frame rate) between different states, and the finite response speed of the human eye will cause a viewer to see a time average of the truly reflected colours at any one time. This is possible in MEMS systems because they respond very quickly to applied voltages (unlike LCDs), due to the very lightweight membranes and small movement distances involved.

Figure 9:
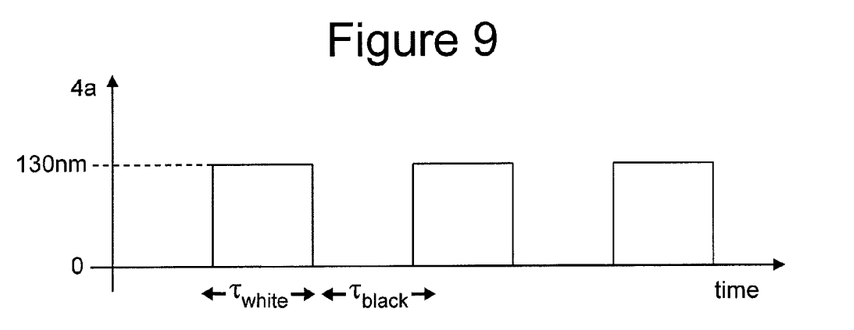
FIG. 9: shows an example of the time-varying value of the lower air-gap that could be used in order to generate a grey reflection.

For example, in order to generate a colourless grey-level intermediate in reflectivity between white and black, the lower 3a and upper 3b membranes should be held in contact, so that the upper air gap 4b is absent or zero. The combined membrane 3a+3b should then be moved up and down in a rapid fashion so that sometimes the lower air-gap 4a is at or close its equilibrium value (in the example of FIG. 5 this is 130 nm), so that during those moments there is a strong, broad-band reflection of visible light (reflectivity $R_{white}$). At other times, the combined membrane 3a+3b is close to or in contact with the thin-film stack 2, so that the lower air-gap 4b is absent or very small, so that during those moments there is very little reflected visible light (reflectivity $R_{black}$). By moving the combined membrane 3a+3b up and down at a rate greater than the response speed of the human eye, what will be perceived by the viewer is a colourless reflection with a reflectivity intermediate between that of the black and white states, i.e. grey. This is illustrated in FIG. 9, which shows the ideal time dependence of the lower air-gap 4a, again for the specific case illustrated in FIG. 5. The graph shows "ideal" behaviour in which the membrane moves infinitely quickly between the two different positions: in reality this will of course take a finite amount of time, but it is hoped that this finite time will represent just a small fraction of the total time frame. During a single time frame, which may correspond to the refresh rate of the display, there will be a period of time $\tau_{white}$ for which the combined membrane 3a+3b is substantially close to its equilibrium position (130 nm for the design of FIG. 5), and a period of time $\tau_{black}$, the combined membrane will be substantially close to the thin-film stack 2. Neglecting the finite response speed of the system, the reflectivity of the grey level achieved will be governed by the following equation:

$$R_{grey} = \frac{\tau_{white} R_{white} + \tau_{black} R_{black}}{\tau_{white} + \tau_{black}},$$

and so it is possible to generate grey levels by changing the relative proportions of the time intervals $\tau_{white}$ and $\tau_{black}$.

Depending on the exact layer structure of the device, it may also be possible to generate intermediate grey-level states by holding the combined membrane 3a+3b at a an intermediate distance from the thin-film stack 2 (in the case of the design of FIG. 5 this would correspond to a lower air-gap of somewhere between 0 nm and 130 nm). Whether it is possible to generate completely colourless grey levels using this alternative technique is simply a function of the exact layer structure used, and if the colour of the grey levels is deemed acceptable this would lead to lower power consumption for the grey level states than the time sequential method described previously.

Figure 10:
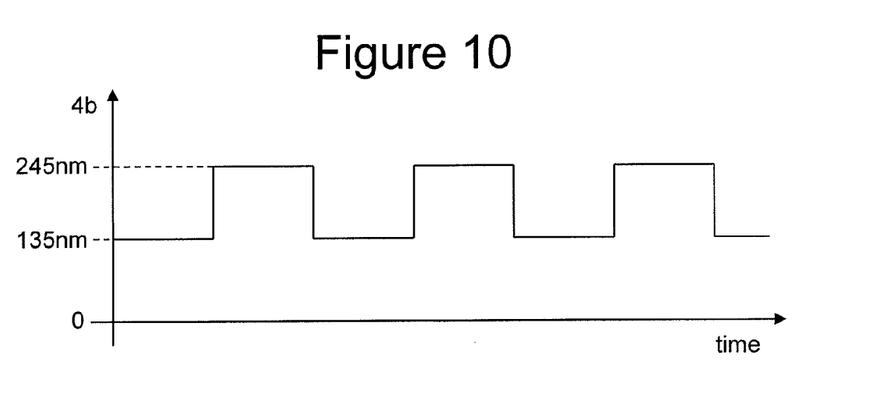
FIG. 10: shows an example of the time varying value of the upper air-gap that could be used in order to generate a magenta reflection.

It has been mentioned above that by using the first mode of operation, it is possible to generate any colour with a single peak wavelength in the visible region of the spectrum, i.e. anything from violet to red, including the secondary colours cyan and yellow. In order to generate the third secondary colour, magenta, however, this requires two peaks in the visible spectrum, and this must therefore be generated by a time sequential variation of the upper air-gap 4b, in much the same way as described for the lower air-gap 4a in generating grey-scale. The lower air-gap 4a should be reduced to zero in order to bring the lower membrane 3a into contact with the thin-film stack 2, and to enter the first mode of operation. The upper air-gap 4b should be varied in a rapid fashion between the values corresponding to blue and red reflections, which in the case of the design in FIG. 5 are 135 nm and 245 nm, respectively. In order to generate a pure magenta colour, the relative time spent in each position should be roughly equal: in order to generate a "redder" magenta, a greater fraction of the time frame should be spent in the red position, and in order to generate a "bluer" magenta a greater fraction of the time should be spent in the blue position.

Figure 11:
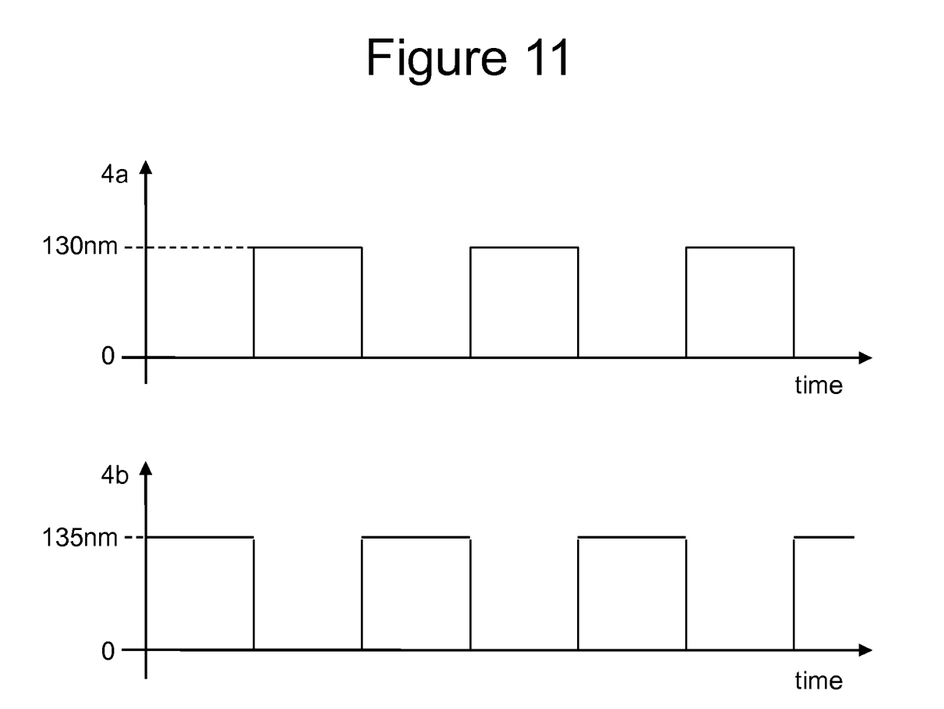
FIG. 11: shows an example of the time varying values of the upper and lower air-gaps which could be used in order to generate a pale blue reflection.

It has now been described how the device can be used to generate the following pixel appearances: black, any saturated colour with a single wavelength peak (violet to red), magenta (double wavelength peak), white and any level of grey. It is of course possible to generate unsaturated colours by time sequentially swapping between the two modes of operation (narrow and broad-band). For example, in order to generate a pale blue reflection, this can be done by relying on the eye's finite response speed to average out reflections which are sometimes blue and sometimes white. An example of the time varying membrane positions for this case is illustrated in FIG. 11. For one part of the time frame, the device is in the first mode of operation: the lower membrane 3a is adjacent to the thin-film stack 2, so that the lower air-gap is absent. The upper membrane 3b is separated from the lower membrane 3a by an upper air-gap 4b of such a value as to reflect blue light (in the case of the design of FIG. 5, this is 135 nm). For the other part of the time frame, the lower air-gap 4a is restored to its equilibrium value (corresponding to 130 nm in the design of FIG. 5), and the lower 3a and upper 3b membranes are brought into contact, with the result that a strong broad-band reflection is obtained (white). Provided that the time frame is less than the response time of the human eye, then what will be perceived is a mixture of blue and white, i.e. pale blue. It is clear that other non-saturated or darker colours can be generated by mixing suitable amounts of black, white and coloured reflections.

It is therefore possible, using a single interference-based MEMS pixel which has two independently controllable membranes, to generate both black, white, grey, saturated and unsaturated colours. A display made from an array of such pixels would have very good colour and white state reflectivities, both because of the lack of colour sub-pixels (tunable colour is used instead), and the highly reflective broadband white state that is achieved by the second mode of operation.

Although the lower and upper gaps 4a, 4b have been described herein primarily in the context of being air-filled, it will be appreciated that any of a variety of other gases may be suitably employed within the gaps in accordance with the invention. Preferably the gas is moisture free and otherwise non-reactive with the surrounding elements within the device. The display as a whole is preferably hermetically sealed to retain the gas within the gaps 4a, 4b. Of course, the pressure of the gas within the gaps should be such as not to restrict the operation of the membranes as described herein.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

INDUSTRIAL APPLICABILITY

The display described in this invention works as a reflective display only, i.e. it does not generate light and is therefore suitable for use in well-lit conditions, such as office conditions and outdoors. It is therefore suitable for portable devices such as mobile phones, PDAs, e-books, hand-held games consoles, laptop computers and the like. It is also highly suited to larger area outdoor displays such as signage, information displays and billboards. This reflective display, like any other, can also be fitted with a front light to enable its use in darker conditions, which would facilitate its use with the devices mentioned above in darker conditions, and the use in other types of displays such as desktop monitors and televisions.

The invention claimed is:

1. An interference-based MEMS device, comprising:
a lower substrate including a substrate electrode;
a lower membrane spaced apart from the lower substrate by a lower gap, the lower membrane including a lower membrane electrode;
an upper membrane located on a side of the lower membrane opposite the lower substrate and spaced apart from the lower membrane by an upper gap, the upper membrane including an upper membrane electrode; and
control circuitry configured to provide control voltages to the electrodes of the lower substrate, the lower membrane and the upper membrane to change the dimensions of the lower gap and the upper gap to control the reflective properties of the device with respect to light incident upon the lower substrate.

2. The device according to claim 1, wherein the control circuitry is configured to control the dimensions of the lower gap and the upper gap independently.

3. The device according to claim 1, wherein the lower substrate and the lower membrane are substantially transmissive, and the upper membrane is substantially reflective.

4. The device according to claim 1, wherein the control circuitry is configured to provide a first mode of operation in which the dimension of the lower gap is reduced to zero such that the lower membrane is held in contact with the lower substrate, and a colour of light reflected by the device is determined by controlling the dimension of the upper gap.

5. The device according to claim 4, wherein during the first mode of operation when the dimension of the upper gap is at an equilibrium state the colour of the reflected light is red, and when the dimension of the upper gap is reduced to zero the colour of the reflected light appears substantially black.

6. The device according to claim 5, wherein at corresponding intermediate dimensions of the upper gap the colour of the reflected light includes blue and green.

7. The device according to claim 1, wherein the control circuitry is configured to provide a second mode of operation in which the dimension of the upper gap is reduced to zero such that the upper membrane is held in contact with the lower membrane, and the intensity of light reflected by the device is determined by controlling the dimension of the lower gap.

8. The device according to claim 7, wherein during the second mode of operation when the dimension of the lower gap is at an equilibrium state the reflected light is white, and when the dimension of the lower gap is reduced to zero the reflected light appears substantially black.

9. The device according to claim 7, wherein at corresponding intermediate dimensions of the lower gap the reflected light includes respective grey levels.

10. The device according to claim 1, wherein the lower membrane electrode and the upper membrane electrode are patterned to define an array of pixels independently controlled by the control circuitry.

11. The device according to claim 1, wherein the lower membrane and the upper membrane are attached to the lower substrate at intervals.

12. The device according to claim 1, wherein the lower gap and upper gap are air-filled.

13. The device according to claim 12, wherein the lower membrane and the upper membrane include via holes to facilitate air entering and exiting the lower gap and upper gap.

14. A portable device comprising a display, wherein the display comprises an interference-based MEMS device according to claim 1.

15. A method of controlling an interference-based MEMS device according to claim 4, wherein colours of reflected light requiring multiple peaks in the visible spectrum are provided in the first mode of operation by rapidly varying the dimension of the upper gap so as to be perceived by a viewer as a single colour.

16. A method of controlling an interference-based MEMS device according to claim 7, wherein levels of grey scale are provided by rapidly varying the dimension of the lower gap so as to be perceived by a viewer as a single grey scale level.

17. A method of controlling an interference-based MEMS device, the device including a lower substrate including a substrate electrode; a lower membrane spaced apart from the lower substrate by a lower gap, the lower membrane including a lower membrane electrode; an upper membrane located on a side of the lower membrane opposite the lower substrate and spaced apart from the lower membrane by an upper gap, the upper membrane including an upper membrane electrode; and control circuitry configured to provide control voltages to the electrodes of the lower substrate, the lower membrane and the upper membrane to change the dimensions of the lower gap and the upper gap to control the reflective properties of the device with respect to light incident upon the lower substrate, the method comprising:

during a first mode of operation reducing the dimension of the lower gap to zero such that the lower membrane is held in contact with the lower substrate, and controlling the dimension of the upper gap to control a colour of light reflected by the device, wherein colours of reflected light requiring multiple peaks in the visible spectrum are provided by rapidly varying the dimension of the upper gap so as to be perceived by a viewer as a single colour;

during a second mode of operation reducing the dimension of the upper gap to zero such that the upper membrane is held in contact with the lower membrane, and controlling the intensity of light reflected by the device by controlling the dimension of the lower gap, wherein levels of grey scale are provided by rapidly varying the dimension of the lower gap so as to be perceived by a viewer as a single grey scale level; and     time sequentially combining the first and second modes of operation so as to be perceived by a viewer to produce an unsaturated colour of light reflected by the device.

* * * * *